(12) United States Patent
Chambers

(10) Patent No.: US 7,436,851 B1
(45) Date of Patent: Oct. 14, 2008

(54) DESTINATION CALL ROUTING APPARATUS AND METHOD

(75) Inventor: Mahdi S. Chambers, Irvington, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/280,618

(22) Filed: Mar. 29, 1999

(51) Int. Cl.
*H04J 3/22* (2006.01)

(52) U.S. Cl. .......................... 370/467; 370/352; 370/353

(58) Field of Classification Search ......... 370/325–356, 370/385, 522, 467
See application file for complete search history.

(56) References Cited

U.S. PATENT DOCUMENTS

| | | | | |
|---|---|---|---|---|
| 6,002,689 A | * | 12/1999 | Christie et al. ............... | 370/401 |
| 6,005,859 A | * | 12/1999 | Harvell et al. ................ | 370/352 |
| 6,021,136 A | * | 2/2000 | Bharucha et al. ............. | 370/477 |
| 6,023,474 A | * | 2/2000 | Gardner et al. ............... | 370/467 |
| 6,078,582 A | * | 6/2000 | Curry et al. ................... | 370/356 |
| 6,084,956 A | * | 7/2000 | Turner et al. .................. | 379/230 |
| 6,115,460 A | * | 9/2000 | Crowe et al. ............ | 379/211.02 |
| 6,122,255 A | * | 9/2000 | Bartholomew et al. ...... | 370/237 |
| 6,131,095 A | * | 10/2000 | Low et al. ...................... | 707/10 |
| 6,169,735 B1 | * | 1/2001 | Allen et al. ................... | 370/352 |
| 6,289,097 B1 | * | 9/2001 | Gregory et al. .............. | 379/338 |
| 6,292,463 B1 | * | 9/2001 | Burns et al. .................. | 370/216 |
| 6,327,258 B1 | * | 12/2001 | Deschaine et al. ........... | 370/356 |
| 6,333,931 B1 | * | 12/2001 | LaPier et al. ................. | 370/385 |
| 6,339,594 B1 | * | 1/2002 | Civanlar et al. .............. | 370/352 |
| 6,442,169 B1 | * | 8/2002 | Lewis .......................... | 370/401 |
| 6,603,850 B1 | * | 8/2003 | Stahl et al. .............. | 379/221.02 |

OTHER PUBLICATIONS

Black, Uyless. ATM Foundation for Broadband Networks. Copyright 1995. Prentice Hall PTR. pp. 76-86.*

* cited by examiner

*Primary Examiner*—Chi H. Pham
*Assistant Examiner*—Donald L Mills

(57) ABSTRACT

A Destination Call Router network element is provided for Internet Protocol dial-up congestion relief, providing Public Switched Telephone Network off-load. The network element, a combination of an Asynchronous Transfer Mode switch and a Broadband Interworking Call Router with application software, is interposed as a node within the conventionally arranged PSTN. Call data is interworked to destination locations based upon call types associated with called directory numbers. Signaling messages for voice-type calls are forwarded over the standard telephony signaling network to destination End Offices. Signaling for Internet Protocol calls is routed to a Remote Access Server via a Primary Rate Interface after translation to an applicable ISDN protocol, thereby bypassing destination End Offices for IP calls. For both call types, the network element controls its constituent ATM switch to direct ensuing call communications to the appropriate destination. Call Detail Records are collected for IP calls and forwarded to the existing call accounting system of the conventionally arranged PSTN.

38 Claims, 6 Drawing Sheets

DESTINATION CALL ROUTING APPARATUS AND METHOD

FIELD OF THE INVENTION

The invention relates generally to telephony and more specifically to the routing of calls on the public switched telephone network.

BACKGROUND

The explosive growth of the Internet has transformed the way people communicate with each other and conduct business. The Internet is an international network of interconnected computers which provide the means to communicate easily with others and to access easily vast amounts of information from around the world. One aspect of the Internet is the World Wide Web (WWW), which is an amalgamation of on-line web sites that replicate electronically some of the educational, entertainment and commercial offerings of the off-line everyday world.

Typically, personal computer access to the Internet is provided by an Internet Service Provider (ISP), which is able to offer its customers various "on-line" services, including electronic mail, file transfers, and the ability to browse and publish on the WWW. ISPs enable their customers to quickly and efficiently partake of the diverse on-line content and services offered at web sites by combining computer processing, information storage, protocol conversion and routing with communication links to Internet web sites.

To access the Internet, a user dials a directory number to access an ISP facility via a modem through application software resident on the user's computer. Once a connection is established between the user's computer and the ISP facility, the user interacts with the application interface and communicates with the ISP. The ISP acts as a conduit through which the user accesses the offerings of the Internet.

With the increasing popularity of the Internet and the WWW, users are routinely accessing/downloading vast quantities of data as well as exchanging messages and files. This has resulted in a substantial increase in the number of calls placed to ISPs as well as the duration of a typical ISP call. While providing great benefits for users, the increased and extended Internet usage has caused several unexpected problems for the existing Public Switched Telephone Network (PSTN).

In conventional systems, calls from a user to an ISP are handled in the same manner as voice calls. That is, when a call is initiated, signaling—including off-hook signals and touchtones—is conveyed from the calling phone to telephony equipment located at his/her End Office (An EO, also known as a Class 5 Office, implies that a Class 5 switch is there located to provide local features such as CENTREX, ISDN, etc. Such telephony equipment at an EO is hereinafter referred to as an EO). In the call scenario where the user and the ISP are both served by the same EO, no tandem switching is involved and the call connection is made through activity internal to the EO. In the call scenario where the ISP "point of presence" (PoP) is located in the same local access area as the user, the EO transmits messages to telephony equipment at a Central Office (CO) of a Local Exchange Carrier (such telephony equipment hereinafter referred to as a LEC) which provides local service and switching for both the caller and the ISP. The LEC utilizes a Tandem switching office (Tandem) to connect the EO serving the user to the EO serving the ISP. In the call scenario where the calling party and the ISP are not in the same local service area, the caller's EO transmits messages to its LEC Tandem which provides the caller's local service and switching. The calling party's Tandem establishes a connection to the ISP through a corresponding EO of the LEC serving the ISP. Communication between equipment serving the calling party and called party may be across competitive long distance carrier (IXC) networks through an IXC PoP serving LECs at each end.

In cases involving tandem switching, the call originating Tandem selects an idle trunk between itself and the call destination location. Described herein is a direct connection from a call originating Tandem to call destination Tandem. However, it should be understood that signaling may be routed through multiple intermediary locations in the PSTN in order to reach the call destination Tandem. The call originating Tandem formulates an initial address message (IAM) and transmits the message across the PSTN to the call destination Tandem. Upon the destination Tandem's receipt of the IAM, determination that it serves the called number, and determination that the called number is currently idle, the destination Tandem formulates an address complete message (ACM) which is routed back to the call originating Tandem. At the same time, the destination Tandem completes the call path in the backwards direction. When and/or if the called subscriber picks up the phone, the destination Tandem formulates an answer message (ANM). By this time, the trunk must also be connected to the called line in both directions to allow conversation. The call originating Tandem ensures that the calling subscriber is connected to the outgoing trunk (in both directions) so that the parties are able to communicate with each other, exchanging voice or Internet Protocol (IP) data, depending on the type of communication initiated. When either party first hangs up, the corresponding equipment generates a release message (REL) addressed to the other party's equipment, which identifies the trunk associated with the call that is to be disconnected and returned to idle status. Once idled on one end, a release complete message (RLC) is generated and addressed back to the sender of the REL to idle the identified trunk.

As described, in conventional systems, the circuit switches and transmission line allocated for the call remain allocated for a particular call until released at the call's conclusion. Due to the extended duration of typical calls to an ISP, the PSTN's embedded base of circuit switches experience higher usage rates, causing considerable congestion at times when the network is carrying a significant number of calls supporting IP dial-up traffic. This burden on the existing circuit switch backbone of the PSTN is expected to become worse as the projected number of Internet users reaches and exceeds 100 million over the next few years. With the increased usage of PSTN facilities attributable to Internet traffic, the switching and transmission facilities of the PSTN will rapidly approach capacity.

To avoid unacceptable service degradation due to network facilities operating at or near capacity, the standard method for increasing network capacity is to build out the circuit switches of the network at each LEC, as well as to increase inter-switch transmission capacity. However, this solution is costly in both monetary and spatial requirements. Furthermore, PSTN service providers plan in the future to migrate from the existing bandwidth limited switched circuit networks to packet oriented networks which support the transport of voice, data, and video services. Thus, building out the circuit switching network to address Internet-driven traffic congestion is not only an inefficient and expensive approach, it also fails to consider the future evolution of the PSTN.

SUMMARY OF THE INVENTION

Accordingly, it is an objective of the invention to provide a network element that furnishes Internet Protocol (IP) dial-up congestion relief, characterized herein as Public Switched Telephone Network (PSTN) off-load, in order to maximize network availability and protect revenue streams. Such a network element will integrate into the existing PSTN, provide high service availability, be scaleable quickly to large numbers and be consistent with the PSTN's expected future evolution. To that end, a network element to facilitate PSTN off-load is provided that is able to separately identify incoming voice and IP calls in real-time and to cause voice calls to be routed to a specific voice switch and IP calls to be routed to a Remote Access Server (RAS), while preserving billing information for those IP calls.

That network element, called a Destination Call Router (DCR), combines at least one Asynchronous Transfer Mode (ATM) switch and a Broadband Interworking Call Router (BICR) along with appropriate application software. The BICR operates to intercept the originating call signaling and, based on a determination from such call signaling as to whether the call is a voice or an IP call, to direct voice and data calls through the ATM switch to either a voice circuit switch or to a Remote Access Server (RAS). In a preferred embodiment, that determination is made based on whether or not the destination telephone number is an ISP location. The DCR is interposed within the signaling network and the digitized voice transmission system of the existing PSTN. In the operation of the DCR, the BICR acts as a node within the signaling network, intercepting, translating and directing the routing of call data in conjunction with the ATM switch.

The BICR identifies call types (as between voice and IP) in real-time and causes call set-up signaling and associated call data to be routed through the ATM switch via a particular routing mode based upon call type. If a call is voice type, the BICR makes such a determination based on the intercepted signaling message and causes that signaling data and the associated call data to be routed via the ATM switch to the voice circuit switch in the serving End Office. If a call is IP type, the BICR translates the signaling message to an Integrated Services Digital Network (ISDN) message and causes the translated call set-up signaling message and the associated call data to be routed via the ATM switch across a Primary Rate Interface (PRI) to an Remote Access Server (RAS) associated with the called directory number. Note however, that with the method of the invention, billing information for IP calls will no longer be captured by the existing billing system. Therefore, the BICR also collects Call Detail Records (CDRs) for forwarding to the existing call accounting system of the Competitive Local Exchange Carrier (CLEC) and Incumbent Local Exchange Carrier (ILEC) network.

The present invention allows local exchange carriers to segregate voice and IP traffic coming from an call originating Tandem, and causes the IP traffic to be routed outside the circuit switched network, thereby relieving congestion in the circuit switched network without requiring additional investment in circuit switches. The same architecture supports the contemplated next generation multi-service network, which will support voice as well as ATM, IP, Private Branch Exchange (PBX) interconnect, and legacy data interfaces among others.

BRIEF DESCRIPTION OF THE DRAWINGS

For a better understanding of the present invention, reference may be had to the following description of exemplary embodiments thereof, considered in conjunction with the accompanying drawings, in which.

In the detailed description below, like reference numerals are used to describe the same, similar or corresponding elements in FIGS. 1-6.

DETAILED DESCRIPTION

Figure 1:
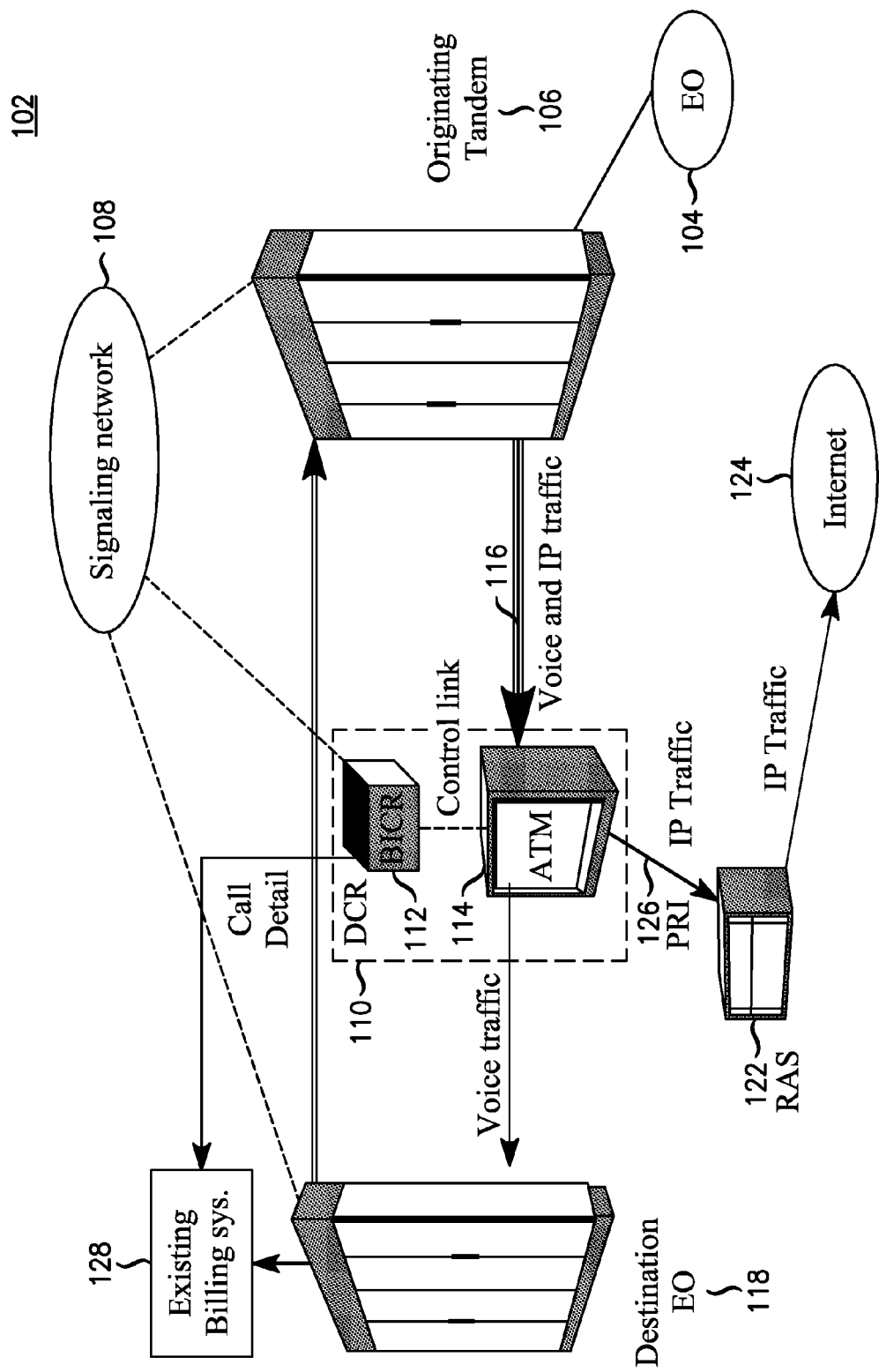
FIG. 1 illustrates an exemplary embodiment of the present invention.

The present invention is a novel network element for providing Internet Protocol (IP) dial-up congestion relief, for call scenarios involving tandem switching, through the method of Public Switched Telephone Network (PSTN) off-load. The network element, called a Destination Call Router (DCR), combines at least one Asynchronous Transfer Mode (ATM) switch and a Broadband Interworking Call Router (BICR) with application software to interwork call set-up signaling and ATM switch signaling. The DCR acts as a node interposed within the PSTN. The DCR interworks (i.e., intercepts, translates and routes) call set-up information in order that voice and data calls are directed through the ATM switch to either a voice switch or a Remote Access Server (RAS), based upon the call type as determined by the called directory number. In this manner, Internet Protocol (IP) calls may be routed to an Internet Service Provider (ISP) while bypassing circuit switches. The DCR also collects Call Detail Records (CDRs) for forwarding to the existing call accounting system of the PSTN.

The DCR is susceptible to positioning in various locations within the PSTN and may act as a node between two Tandem switching offices (Tandems) or between a Tandem and a End Office (EO) serving a called party. While this invention may be implemented in many different forms, there is shown in the drawings and will herein be described in detail specific embodiments, with the understanding that the present disclosure is to be considered as an example of the principle of the invention and not intended to limit the invention to the specific embodiments shown and described.

DESCRIPTION OF AN EXEMPLARY EMBODIMENT

FIG. 1 illustrates an exemplary embodiment of the present invention interposed within the PSTN 102. When a user initiates a call, signaling messages—which may include off-hook signals, touch-tones, and formatted communications—are conveyed from the caller (not shown) to the caller's EO 104. The signaling messages are passed to a Local Exchange Carrier (LEC) originating Tandem 106, which is a generic circuit switch, typically a 5ESS circuit switch. The Tandem in conjunction with the serving EO furnishes the caller's local service and switching. Signaling System Seven (SS7) ISDN User Part (ISUP) signaling messages are then directed via a SS7 A-linked Signaling Network 108 to the network element of this invention, described further below.

The network element of the present invention, called a DCR 110, comprises a BICR 112 controlling an associated ATM switch 114. In a preferred embodiment the ATM switch 114 is an "PacketStar™ Access Concentrator 120" available from the assignee herein, Lucent Technologies of Murray Hill, N.J. The DCR includes in its BICR an appropriate Application Programming Interface (API) to command its ATM switch and signal connected PSTN network elements. The "PacketStar™ Access Concentrator 120" of the preferred embodiment is controlled by the "Sapphire" API, which is used by the BICR to send switch fabric control messages that set up/tear down connections within the ATM switch (e.g., port 1 to port N (not shown)). The "Sapphire" API is currently available from Lucent Technologies of Murray Hill, N.J., the assignee herein. The DCR interworks telephony signaling to direct voice and IP traffic (arrow 116)—interworking being defined as the interception of data from a first location, contingent conversion of data of a first protocol to corresponding data of a second protocol, and routing of data to a second location. In a preferred embodiment, the BICR will support interworking of SS7 to SS7 and SS7 to ISDN Primary Rate Interface (PRI) Q.931 signaling formats. PRI is a standard level of service for larger users of ISDN digital transmission service, and includes a number of B (bearer) channels for data, voice, and other services and a D (delta) channel for control and signaling information. Q.931 is the standard protocol for transmission over the D channel of a PRI.

The originating Tandem 106 performs a routing table lookup of directory numbers associated with a particular destination location to determine the network element to which signaling messages will be routed for a particular call. When the originating Tandem 106 determines that a DCR should be signaled for a particular call, upon receipt of the signaling message across the Signaling Network 108 from originating Tandem 106, the BICR 112 of the DCR 110 interprets the signaling message to determine the called directory number. In a preferred embodiment, the BICR performs a routing table lookup of directory numbers associated with an ISP and provided by an ISP for customer access to the Internet. In this manner, the BICR determines whether the attempted call is for voice traffic or IP traffic. It should, however, be understood that other means for identifying ISP traffic are also intended to be within the scope of the invention.

Voice traffic is routed to a destination End Office (EO) 118, as in conventional systems. The BICR 112 of a DCR 110 forwards signaling messages across the Signaling Network 108 to a destination EO 118 in order to have a voice circuit switch and transmission line allocated by destination EO 118. Reply signaling messages from destination EO 118 are returned across the Signaling Network 108 through the BICR 112 to originating Tandem 106. Once the voice circuit has been established, the BICR 112 also controls ATM switch 114 of the DCR 110 to route the voice traffic on the digitized voice transmission system from originating Tandem 106 to destination EO 118. Appropriate API commands from BICR 112 to ATM switch 114 control a switched connection or soft Permanent Virtual Circuit (PVC) to destination EO 118.

IP traffic is routed to a destination RAS 122, which provides access to the ISP and thence the Internet 124. BICR 112 of DCR 110 sends the intercepted call signaling message to destination RAS 122 via ISDN Q.931 signaling over a PRI (arrow 126) D (delta) channel from the ATM switch 114. In an exemplary embodiment, destination RAS 122 is a "PortMaster® 4" which is currently manufactured by the assignee herein, Lucent Technologies of Murray Hill, N.J. The "PortMaster® 4" is a remote access server which lacks SS7 signaling capability, although any standard RAS that supports PRI Q.931 signaling may be used. Of course, the BICR may be programmed to operate with RASs that support other signaling formats. The BICR 112 also controls a switched connection or soft PVC at ATM switch 114 to route the IP traffic across an ISDN PRI B (bearer) channel to an RAS 122 corresponding to the location of the addressed ISP. Note, however, that the use of other transmission paths between the ATM switch and a given RAS—e.g., a dedicated T1 channel—would also be within the contemplation of the invention.

The BICR collects raw Call Detail Records (CDRs) for all IP calls under the method of the invention, since billing information for such calls will no longer be captured by existing billing systems 128 of the PSTN. The CDRs detail call information which may include call start and end time-stamps, called party directory number and sub-address, calling party directory number and sub-address, disconnect reason, inbound and outbound B channel, inbound and outbound Circuit Identification Code (CIC), inbound and outbound node identification and other information as desired. The CDRs are stored, preferably in Bellcore's Accounting Management Accounting (AMA) format, and later transferred electronically by BICR 112 to the existing billing system 128 of the PSTN a Local Area Network connection (e.g., Ethernet). Any other billing format is easily substituted according to customer demand and of course, other transmission paths may be traversed from the DCR to the existing billing system.

The voice and Internet Protocol (IP) traffic transmitted between the originating Tandem and the DCR may be distributed over any digitized voice transmission system including T1, E1, STS-1, and DS-3. As would be understood by those skilled in the art, a DCR also may be interworked with other digitized transmission systems and signaling networks formats. Moreover, additional interfaces such as frame relay, native ATM, and Ethernet, may be used to create a multiservice device. In this manner, the DCR supports the multiservice infrastructure forming the basis of the next generation multi-service PSTN, and is able to support voice as well as ATM, IP, Private Branch Exchange (PBX) interconnect, and legacy data interfaces.

A DCR allows separation of IP traffic from the voice network in real-time, thereby enabling congestion relief for PSTN circuit switches. Of course, it would be understood that the DCR may be scaled to comprise a plurality of ATM switches controlled by a single BICR, routing calls to multiple destination EOs and/or RASs. Tandems, EOs, RASs and other telephony infrastructure on either or both ends of the connection may be provided by an Incumbent Local Exchange Carrier (ILEC), Competitive Local Exchange Carrier (CLEC), or Interexchange Long Distance Carrier (IXC), as chosen by the user/customer and/or ISP.

Figure 2:
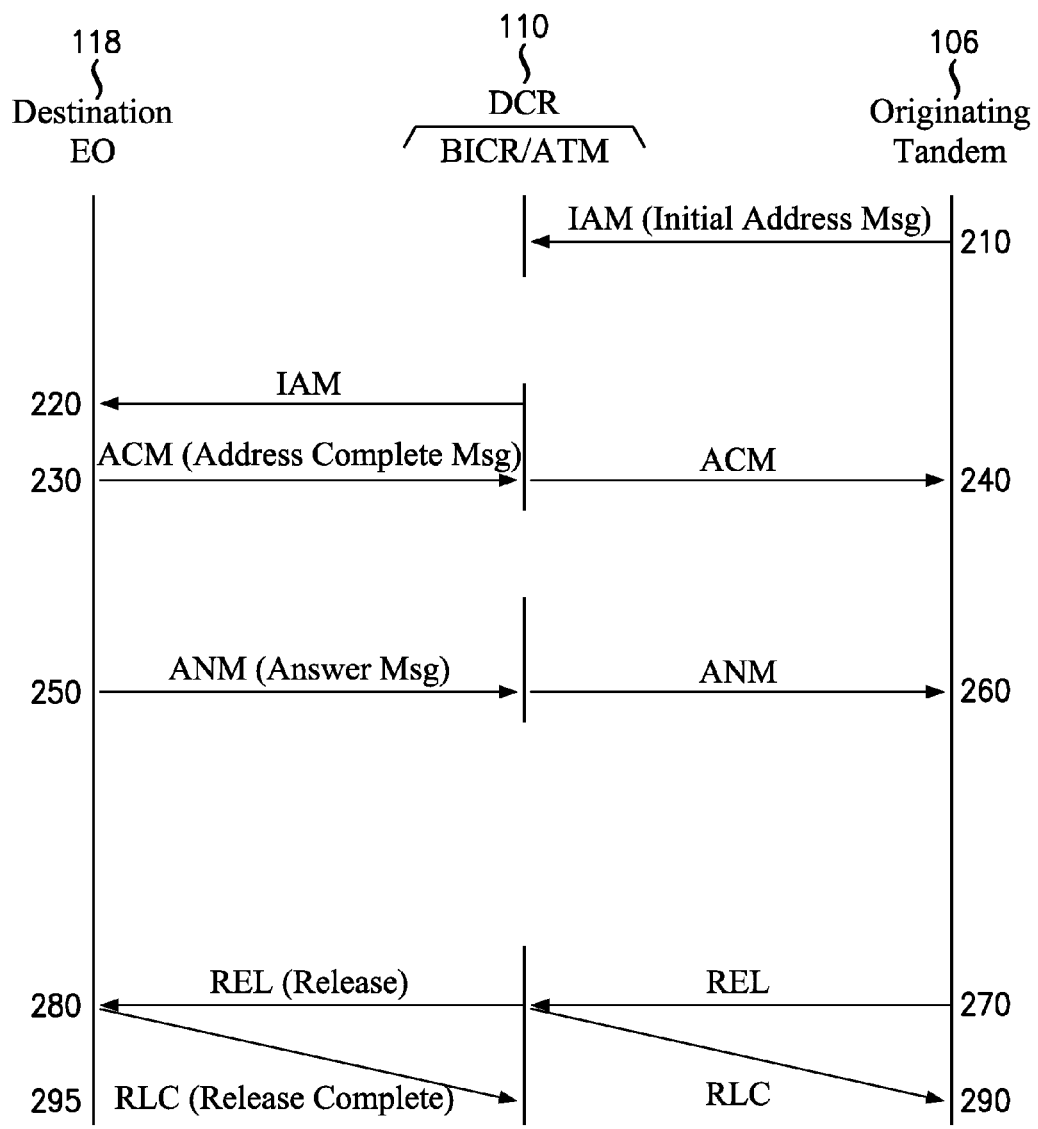
FIG. 2 illustrates a basic call scenario for voice traffic in accordance with the invention.
Figure 3:
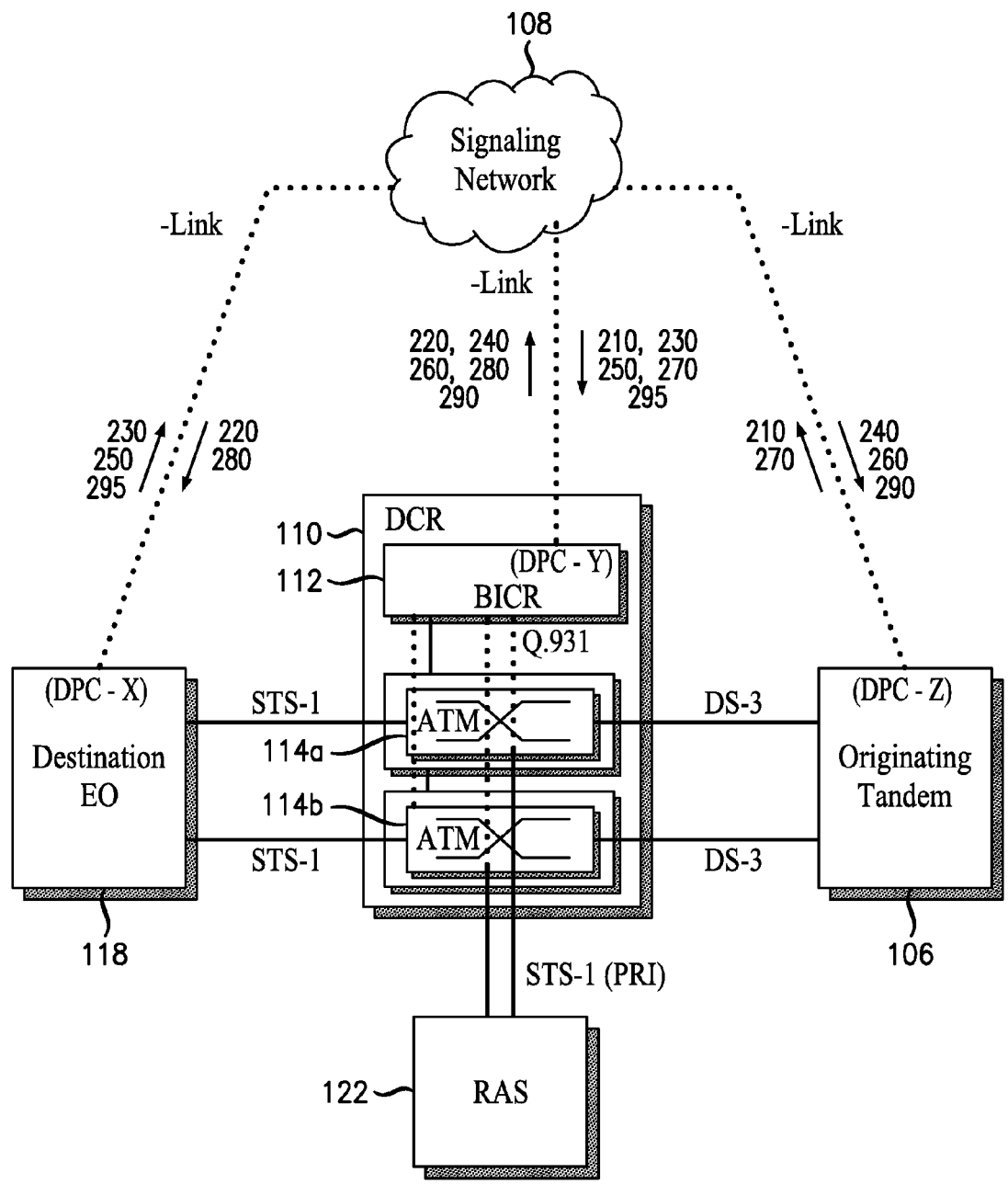
FIG. 3 illustrates a signaling message flow corresponding to the basic call scenario for voice traffic depicted in FIG. 2.

Voice Traffic:

Referring now to FIG. 2 in which reference numbers 210-295 denote actions undertaken at sequential points in time, the exemplary call scenario for voice traffic in accordance with the invention is illustrated. FIG. 2 is best understood with reference to FIG. 3, which depicts the message flow across the signaling network during a voice traffic call. As a first step, the DCR node, comprising the BICR/ATM switch combination, is assigned a Destination Point Code (DPC) within the signaling network. For instance, destination EO 118 is assigned DPC-X, DCR 110 is assigned DPC-Y and originating Tandem 106 is assigned DPC-Z. When a user attempts to initiate a call at his/her location involving tandem switching, his/her assigned Tandem 106 determines from a table look-up that the called number is in an area served by a DCR. The Tandem 106 then sends an Initial Address Message (IAM) at step 210, via the SS7 A-linked Signaling Network to the DCR. The DCR, based on the called directory number, determines that attempted call is not an ISP Internet access directory number but a voice call bound for a destination EO. The DCR routes the signaling for this call to the destination EO via the Signaling Network. All other routing decisions and validation checks are left to the destination EO.

The forwarded IAM is received by the destination EO at step 220 and an Address Complete Message (ACM) is replied at step 230. Upon receiving the IAM message, the DCR cuts through the voice circuit within one of its ATM switches in both directions at step 240. The DCR then sends an Answer Message (ANM) to the originating Tandem at step 260, upon receiving an ANM sent from the destination EO at step 250. At this time, the call is connected and stable until one of the parties releases it, which will be indicated by a Release Message (REL) from the call terminating equipment. The DCR will complete the release in the opposite direction and release the switch circuits and the switch cut-through in the ATM switch. For instance, at step 270 the call is released by the originating Tandem and a REL is sent to the DCR. The DCR sends a REL to the destination EO at step 280 and sends a Release Complete Message (RLC) to the originating Tandem at step 290. The DCR then awaits receipt of a RLC from the destination EO terminating the call and releasing the switch circuit of the destination EO and ATM cut-through at step 295.

Figure 4:
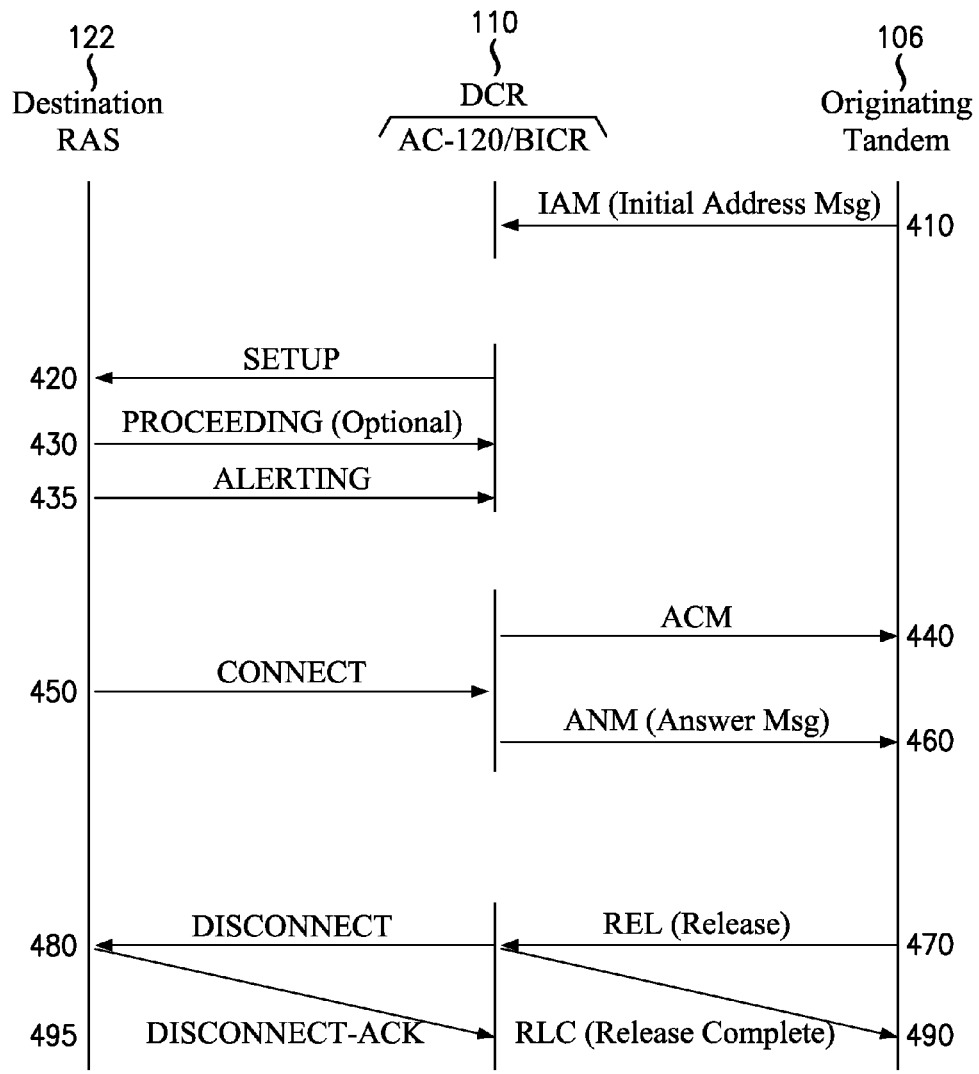
FIG. 4 illustrates a basic call scenario for Internet traffic in accordance with the invention.
Figure 5:
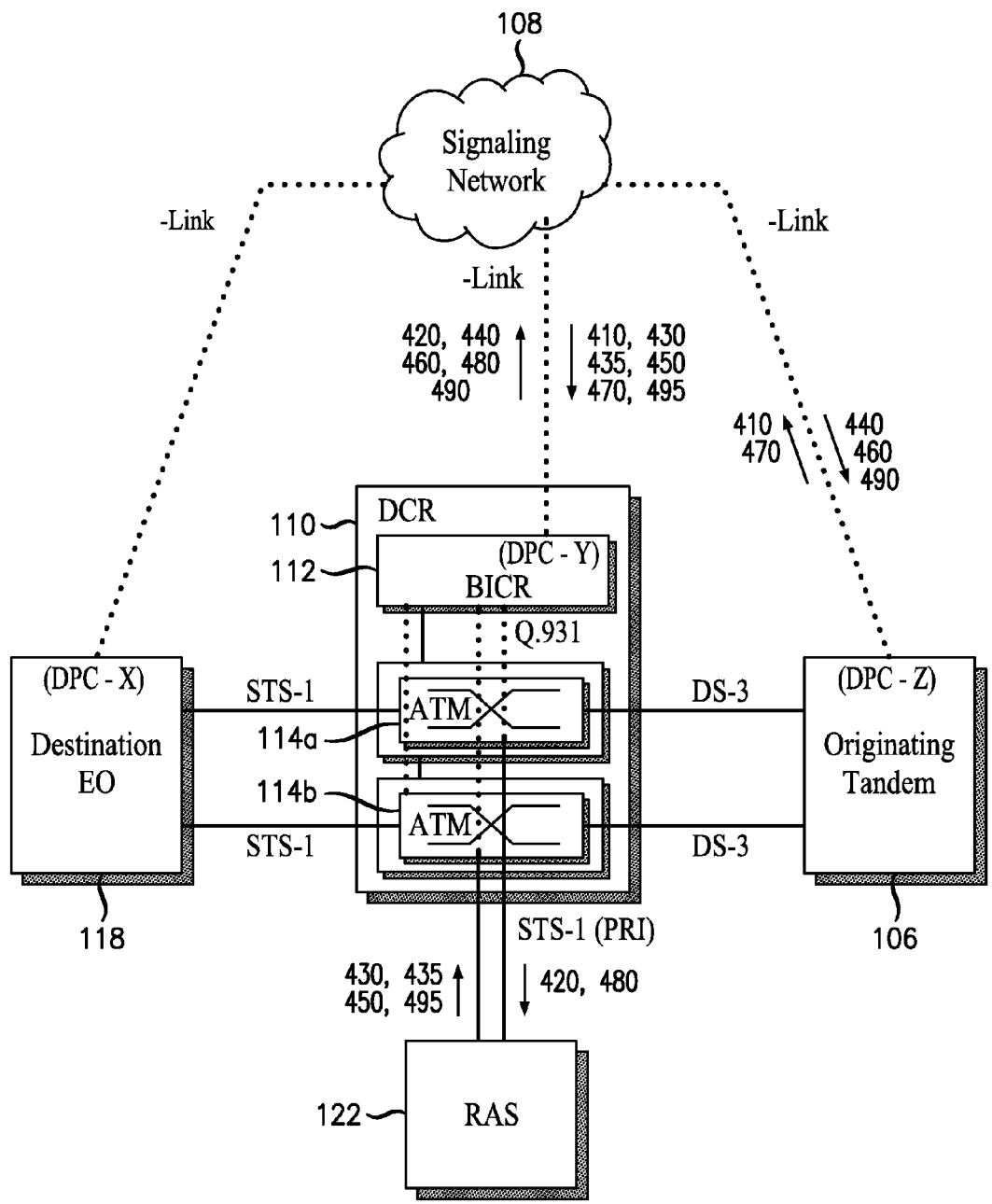
FIG. 5 illustrates a signaling message flow corresponding to the basic call scenario for Internet traffic depicted in FIG. 4.

Internet Protocol Traffic:

Referring now to FIG. 4 in which reference numbers 410-495 denote actions undertaken at sequential points in time, the basic call scenario for IP traffic in accordance with the invention is illustrated. FIG. 4 is best understood with reference to FIG. 5, which depicts the message flow across the signaling network during an IP traffic call. DCR 110 acts as a node of the Signaling Network, intercepting and interworking all messages between an originating Tandem 106, a destination EO 118 and an RAS 122. A user initiates a call at his/her location and originating Tandem 106 determines from a table look-up that the called number is in an area served by a DCR. The Tandem 106 then sends an Initial Address Message (IAM) at step 410, via the SS7 A-Linked Signaling Network to a DCR 110. The DCR performs a table lookup and determines that the called directory number is an ISP Internet access directory number, which is associated with a RAS. The DCR routes the signaling for this call via an ISDN PRI and Q.931 signaling to RAS 122, performing all necessary validation checks and signaling message translations prior to routing.

The signaling IAM is translated to a SETUP message, routed to and received by RAS at step 420. The RAS responds with a PROCEEDING message (optional) at step 430 and an ALERTING message at step 435. Upon receiving the ALERTING message from the RAS, the DCR cuts through the virtual circuit within one of its constituent ATM switches in both directions thereby connecting the input voice circuit from Tandem 106 with a selected B-channel connected to the RAS. The cut-through is implemented by sending the appropriate API command to the ATM switch and routing an Address Complete Message (ACM) to the originating Tandem at step 440. The DCR then sends an Answer Message (ANM) to the originating Tandem at step 460, upon receiving a CONNECT message sent from the RAS at step 450. At this time, the call is connected and stable until one of the parties releases it, which will be indicated by a Release Message (REL) from the originating Tandem or a DISCONNECT message from the RAS. The DCR will complete a call release in the opposite direction, releasing the switch circuits at the Tandem and the switch cut-through in the ATM switch. For instance, at step 470 the call is released by the originating Tandem and a REL is sent to the DCR. The DCR sends a DISCONNECT message to the RAS at step 480 and sends a Release Complete Message (RLC) to the originating Tandem at step 490. The DCR then awaits receipt of a DISCONNECT-ACK message from the RAS terminating the call and releasing the channel resources at step 495. In this case, the BICR also generates CDRs for later electronic transfer via a Local Area Network connection (e.g., Ethernet) to existing call accounting systems.

Figure 6:
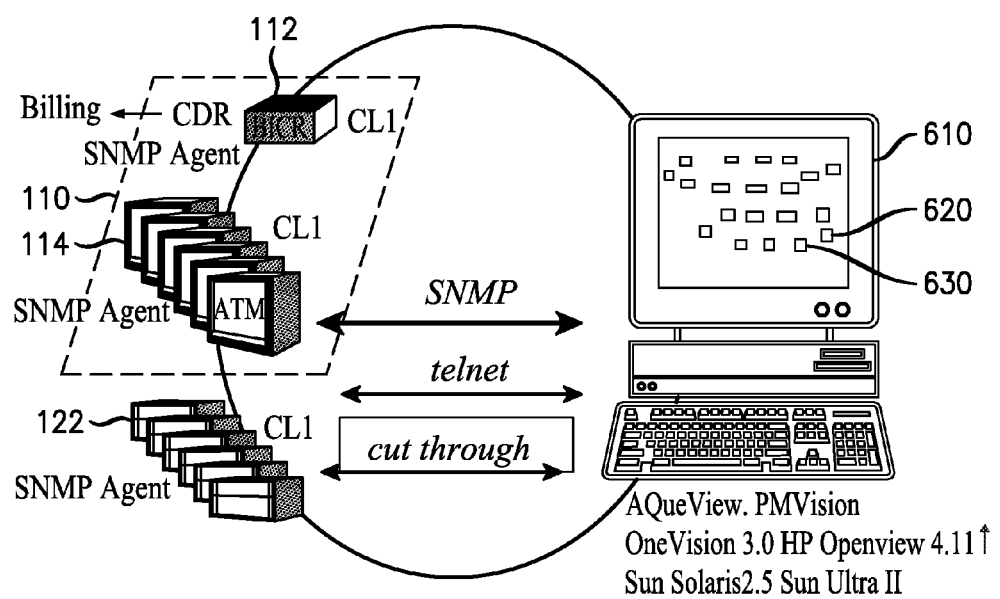
FIG. 6 is an illustration of a portion of a network management system.

Destination Call Router Programming Control:

Referring to FIG. 6, an exemplary system for network management control of the DCR network element implemented within the PSTN is illustrated. A network management computer 610 is arrayed with element managers resident in memory and interconnected with some of the network elements of the PSTN. The element managers are displayed pictorially as icons on the network management computer monitor, along with other resident software applications. From the network management computer, the elements comprising a DCR 110, a BICR 112 and at least one ATM switch 114, are provisionable via a first element manager 620, for example Aquewin in the preferred embodiment. Aquewin, currently manufactured by the assignee herein, Lucent Technologies of Murray Hill, N.J., is an element manager developed to provide remote management of the "PacketStar™ Access Concentrator 120" and BICR. With these abilities, a routing table of ISP Internet access directory numbers, associated Remote Access Servers, and corresponding ATM switches may be constructed. Further, each RAS 122 may be provisioned individually by a second element manager 630, PMVision™, also resident on the network management computer. PMVision™ is an element manager developed to provide remote management of the "PortMaster® 4" and is currently manufactured by the assignee herein, Lucent Technologies of Murray Hill, N.J. These element managers enable the user to provision the programmable parameters of PSTN network elements with a Command Line Interface (CLI) using Telnet and Simple Network Management Protocol (SNMP) commands. Naturally, the individual element managers can be integrated into a single Network Management Application. The network management computer also allows remote access and control of the CDRs stored at the BICR, facilitating CDR editing and programmable transmission of CDRs to the call accounting systems of the PSTN. In the preferred embodiment, the network management platform is a Sun Solaris 2.5 or a Sun Ultra II provided by Sun Microsystems, Inc. of Palo Alto, Calif.

CONCLUSION

There has been described and illustrated herein, a network element that provides IP dial-up congestion relief, protecting the availability of circuit switches in the PSTN. As described, the network element integrates into the existing PSTN, provides high service availability, is easily scaleable and considers the PSTN's future evolution. The Destination Call Router of the present invention, a combination of an ATM switch and a BICR with application software, is interposed as a node within the signaling network and digitized voice transmission system of the existing PSTN. The DCR intercepts and interworks incoming call data based upon call type, which corresponds to the called telephone number. The DCR interworks call set-up signaling to control PSTN network elements and its constituent ATM switch, thereby routing voice calls to destination EOs and Internet protocol calls to destination RASs.

It is to be understood that the invention is not limited to the illustrated and described forms of the invention contained herein. It will be apparent to those skilled in the art that various changes may be made without departing from the scope of the invention and the invention is not considered limited to what is shown in the drawings and described in the specification.

What is claimed is:

1. A method for routing traffic over a Public Switched Telephone Network (PSTN) from an origin location to a destination location associated with a traffic type, said traffic comprising signaling data and traffic data, the method comprising the steps of:
   receiving signaling data from a first switch serving the origin location;
   determining said traffic type from said signaling data that has been received wherein said traffic type is characterized as a first traffic type or a second traffic type, the first traffic type being a non-IP based voice traffic type and the second traffic type being an IP based traffic type;
   directing said signaling data to said destination location associated with said first or second traffic type; and
   controlling a second switch serving said destination location to direct traffic data from the origin location to said destination associated with said first or second traffic type; the second switch configured to direct traffic data of the first traffic type to a destination end office and the second traffic type to another type of destination network element.

2. The method of claim 1 wherein said signaling data comprises an initial message and following messages.

3. The method of claim 1 wherein said step of determining a traffic type further comprises the steps of:
   decoding said signaling data;
   determining a called directory number from said signaling data that has been decoded; and
   matching said called directory number with an entry of a predetermined table correlating directory numbers, said traffic types, and said destination locations.

4. The method of claim 1 further comprising the step of:
   creating a table, wherein each element of said table correlates a directory number with said traffic type and said destination location; and
storing said table.

5. The method of claim 1 wherein said signaling data that has been received and said signaling data that has been directing are of a first protocol.

6. The method of claim 1 wherein said signaling data that has been received is of a first protocol and said signaling data that has been directing is of a second protocol.

7. The method of claim 1 wherein the step of directing said signaling data to said destination location associated with said traffic type that has been determined to establish a call further comprises the steps of:
   forwarding said signaling data that has been received in a first protocol to a first destination network element, when said traffic type is characterized as said first traffic type;
   translating said signaling data that has been received in said first protocol to corresponding signaling data of a second protocol, when said traffic type is characterized as said second traffic type; and
   forwarding said signaling data of said second protocol to a second destination network element, when said traffic type is characterized as said second traffic type.

8. The method of claim 7 wherein said first protocol is Signaling System Seven (SS7) and said step of forwarding is accomplished via a SS7 A-link.

9. The method of claim 7 wherein said second protocol is ISDN Primary Rate Interface (PRI) Q.931 and said step of forwarding is accomplished via a Primary Rate Interface.

10. The method of claim 1 wherein said destination location is a remote access server.

11. The method of claim 1 wherein said step of
    controlling a second switch comprises the steps of:
    sending an application programming interface command to said second switch; and
    setting up a connection through said second switch to a port connected to said destination location according to said command.

12. The method of claim 10 wherein said connection is selected from the group consisting of a switched connection and a soft Permanent Virtual Circuit connection.

13. The method of claim 1 wherein said second switch is an asynchronous transfer mode switch.

14. The method of claim 1 wherein traffic data is distributed over a digitized voice transmission system selected from the group consisting of T1, E1, STS-1, DS-3, frame relay, native ATM, and Ethernet.

15. The method of claim 1 further comprising the steps of:
    storing traffic detail information, when said traffic type is characterized as said second traffic type; and
    transferring said traffic detail information that has been stored to a traffic accounting system.

16. The method of claim 15 wherein said traffic detail information is selected from the group consisting of call start time-stamp, call end time-stamp, called party directory number, called party sub-address, calling party directory number, calling party sub-address, disconnect reason, inbound B channel, outbound B channel, inbound circuit identification code, outbound circuit identification code, inbound node identification, and outbound node identification.

17. A destination call router for routing traffic from an originating location to a destination location over a PSTN, the destination call router comprising:
    a first segment responsive to a first switch of a signaling network for determining a traffic type as a first traffic type or a second traffic type and commanding further action based on said traffic type, the first traffic type being a non-IP based voice traffic type and the second traffic type being an IP based traffic type; and
    a second segment responsive to commands from said first segment for switching, using a second switch, received transmissions between a plurality of destination locations, at least one destination location to an end office being associated with said first traffic type and at least one destination location being associated with said second traffic type.

18. The designation call router of claim 17 wherein said first segment is operable to
    receive call set-up information of a first protocol;
    determine said traffic type from said call set-up information;
    direct said call set-up information of said first protocol to a first location type destination location for said first traffic type and forward replies from said first location type destination location to said originating destination in order to establish a call;

translate said call set-up information of said first protocol to a second protocol for said second traffic type and direct said call set-up information of said second protocol to a second location type destination network element and forward to said originating destination in said first protocol replies in said second protocol from said second location type destination network element in order to establish a call;

control a switch to connect data of said first traffic type to said first type destination network element and data of said second traffic type to said second type destination network element.

19. The destination call router of claim 17 wherein said first segment comprises:
a Broadband Interworking Call Router.

20. The destination call router of claim 17 wherein said second segment comprises:
a plurality of second switches, each second switch being an ATM switch.

21. An apparatus to provide network congestion relief for the public switched telephone network (PSTN), the apparatus comprising:
a receiver for receiving call set-up information of a first protocol from a first switch over the PSTN;
a first processing unit for determining a traffic type from said received information over the PSTN;
a second processing unit for translating said call set-up information of said first protocol to a second protocol, when said traffic type is characterized as a second traffic type over the PSTN;
a transmitter for forwarding, over the PSTN,
a) said call set-up information of said first protocol to an end office, destination network element when said traffic type is characterized as a first traffic type and
b) said call set-up information of said second protocol to a second destination network element type when said traffic type is characterized as a second traffic type, the first traffic type being a non-IP based voice traffic type and the second traffic type being an IP based traffic type; and
means for controlling a second switch over the PSTN serving a destination location to connect data of said first traffic type to said end office, destination network element and data of said second traffic type to said second type of destination network element.

22. The apparatus of claim 21 further comprising:
means for associating call set-up information with one of a plurality of destination network elements; and
means for storing said associated call set-up information.

23. The apparatus of claim 22 further comprising:
means for distinguishing received call set-up information as being associated with one of a plurality of destination network elements of a predetermined destination type.

24. The apparatus of claim 22 further comprising:
means for associating one of said plurality of destination network elements with one of a plurality of second switches; and
means for storing said association.

25. The apparatus of claim 22 further comprising:
means for distinguishing said destination network elements as being associated with one of a plurality of second switches of a predetermined destination type.

26. The apparatus of claim 21 wherein said first processing unit comprises:

a decoder for decoding said call set-up information of a first protocol;
an isolator means for determining the called directory number contained in said received call set-up information; and
a subprocessor for performing a routing table lookup of said determined called directory number on a predetermined table of directory numbers associated with traffic of said second traffic type and setting said type of traffic as said second type if a matching directory number is looked up and as said first type if no matching directory number is looked up.

27. The apparatus of claim 21 wherein said first traffic type is a voice call and said second traffic type is data traffic.

28. The apparatus of claim 21 wherein said second processing unit comprises:
means for converting SS7 call set-up information to the corresponding ISDN Q.931 call set-up information.

29. The apparatus of claim 28 wherein said transmitter comprises:
means for transferring said Q.931 information across a Primary Rate interface to said second type of destination network element.

30. The apparatus of claim 21 wherein said second type destination network element is a remote access server.

31. The apparatus of claim 21 wherein said means for controlling a second switch to route call data comprises:
means for sending an application programming interface command to said second switch; and
means for setting up a connection through said second switch to a port connected to said destination network element according to said received command.

32. The apparatus of claim 21 wherein said second switch is an asynchronous transfer mode switch.

33. The apparatus of claim 21 wherein said traffic data is distributed over a digitized voice transmission system selected from the group consisting of T1, E1, STS-1, DS-3, frame relay, native ATM, and Ethernet.

34. The apparatus of claim 21 further comprising:
means for storing call detail information when said determined traffic type is of said second type; and
means for transferring said stored call detail information to a call accounting system.

35. The apparatus of claim 34 wherein said stored call detail information is selected from the group consisting of call start time-stamp, call end time-stamp, called party directory number, called party sub-address, calling party directory number, calling party sub-address, disconnect reason, inbound B channel, outbound B channel, inbound circuit identification code, outbound circuit identification code, inbound node identification, and outbound node identification.

36. A destination call router for directing voice and data traffic across the PSTN to call destinations and for providing network congestion relief for data traffic, said traffic including signaling and non-signaling traffic from a first switch serving an originating location, said destination call router comprising:
a plurality of asynchronous transfer mode switches, each asynchronous transfer mode switch being a second switch serving a destination location which includes at least a destination end office; and
a Broadband Interworking Call Router (BICR) connected with said asynchronous transfer mode switches, said BICR intercepting signaling of a first or second protocol from a first switch, said BICR translating signaling to a second protocol when receiving signaling for said data calls in said first protocol, said BICR and routing said intercepted signaling to said call destinations, controlling said plurality of asynchronous transfer mode switches to direct traffic to said destinations.

37. A method for routing traffic over a Public Switched Telephone Network (PSTN) from an origin location to a destination location associated with a traffic type, said traffic comprising signaling data and non-signaling traffic data, the method comprising the steps of:

receiving signaling data from a first switch serving the origin location;

determining said traffic type from said signaling data that has been received wherein said traffic type is characterized as a first traffic type or a second traffic type, the first traffic type being a non-IP based voice traffic type and the second traffic type being an IP based traffic type;

translating said signaling data associated with said first traffic type from a first protocol to a second protocol associated with said second traffic type;

directing said signaling data to said destination location associated with said first or second traffic type that has been determined to establish a call; and controlling a second switch serving said destination location to direct traffic data from the origin location to said destination associated with said first or second traffic type; the switch configured to direct traffic data of the first traffic type to an end office and the second traffic type to another type of network element.

38. A destination call router for routing traffic from an originating location to a destination location over a PSTN comprising:

a first segment responsive to a first switch of a signaling network for determining a traffic type as a first traffic type or a second traffic type and commanding further action based on said traffic type, the first traffic type being a non-IP based voice traffic type and the second traffic type being an IP based traffic type; and for translating a call determined to be the first traffic type associated with a first protocol into a second protocol associated with the second traffic type; and a second segment responsive to commands from said first segment for switching, using a second switch, received transmissions between a plurality of destination locations, at least one destination location being an end office associated with said first traffic type and at least one destination location being associated with said second traffic type.

\* \* \* \* \*